US006308298B1

United States Patent
Blatchley et al.

(10) Patent No.: US 6,308,298 B1
(45) Date of Patent: Oct. 23, 2001

(54) METHOD OF REACQUIRING CLOCK SYNCHRONIZATION ON A NON-TRACKING HELICAL SCAN TAPE DEVICE

(75) Inventors: Michael A. Blatchley, Longmont; Richard McAuliffe, Boulder, both of CO (US)

(73) Assignee: Ecrix Corporation, Boulder, CO (US)

( * ) Notice: Subject to any disclaimer, the term of this patent is extended or adjusted under 35 U.S.C. 154(b) by 0 days.

(21) Appl. No.: 09/192,808

(22) Filed: Nov. 16, 1998

(51) Int. Cl.$^7$ .................................................. H03M 13/00
(52) U.S. Cl. ........................... 714/775; 714/776; 360/70; 360/722; 386/69
(58) Field of Search .................................... 714/707, 758, 714/764, 775, 776; 360/53, 77.17, 70, 72.2; 386/67, 69, 75, 104

(56) References Cited

U.S. PATENT DOCUMENTS

| | | | |
|---|---|---|---|
| 3,821,710 | 6/1974 | Arciprete et al. | 360/72.2 |
| 3,962,727 | 6/1976 | Kamimura et al. | 360/85 |
| 4,011,587 | 3/1977 | Arter et al. | 360/62 |
| 4,099,211 | 7/1978 | Hathaway | 360/109 |
| 4,106,065 | 8/1978 | Ravizza | 360/109 |
| 4,125,881 | 11/1978 | Eige et al. | 360/50 |
| 4,172,265 | 10/1979 | Sakamoto et al. | 360/70 |
| 4,175,267 | 11/1979 | Tachi | 386/12 |
| 4,215,377 | 7/1980 | Norris | 360/73 |
| 4,257,075 | 3/1981 | Wysocki et al. | 360/96.5 |
| 4,293,879 | 10/1981 | Heitmann et al. | 360/10 |
| 4,357,639 | 11/1982 | Hama et al. | 360/85 |
| 4,390,915 | 6/1983 | Matsuyama | 360/104 |
| 4,394,694 | 7/1983 | Ninomiya et al. | 360/14.3 |
| 4,404,605 | * 9/1983 | Sakamoto | 360/77.17 |
| 4,412,260 | 10/1983 | Stricklin et al. | 360/97 |

(List continued on next page.)

FOREIGN PATENT DOCUMENTS

| | | |
|---|---|---|
| 29 06 836 A1 | 9/1980 | (DE) . |
| A-0 402 115 | 12/1990 | (EP) . |
| A-0 729 129 | 2/1996 | (EP) . |
| A-0 771 000 | 10/1996 | (EP) . |
| 56-93157 | 7/1981 | (JP) . |
| 58-133665 | 2/1982 | (JP) . |
| 57-55579 | 4/1982 | (JP) . |
| 59-139157 | 1/1983 | (JP) . |

OTHER PUBLICATIONS

Kawamae et al., "A High Speed Signal Processing for Quadruple Speed CD–ROM", 8087 IEEE Transactions on Consumer Electronics 40(1994)Aug., No.3, New York, US.
Pizzi, New Audio Recording Formats, Broadcast Engineering, Feb. 1993, paragraph. 60–63.
NT–1, Apr. 1992.
Sasake, T., Asltad, J., Younker, M., The NT Digital Mcro Tape Recorder, Goddard Conference on Mass Storage Systems and Technologies, Sep. 22–24, 1992, paragraph. 143–157.

*Primary Examiner*—Emmanuel L. Moise
(74) *Attorney, Agent, or Firm*—Jessica Clement

(57) ABSTRACT

A method and apparatus for reacquiring synchronization of a clock synchronization signal with a data signal in a non-tracking storage device is presented. A packet error detector detects errors in data packets from a data signal and generates a packet error status for each reconstructed packet. A read quality detector monitors the packet error status and determines whether the quality of the data signal is of an acceptable versus unacceptable read quality condition. The read quality condition is based on the number of consecutive packets in which an error is detected. Upon detection of an unacceptable read quality condition, the read channel is disabled and the clock synchronize signal is relocked to a known reference frequency. The read channel is then reenabled and the clock synchronization signal is relocked to the data signal.

5 Claims, 4 Drawing Sheets

U.S. PATENT DOCUMENTS

| | | | |
|---|---|---|---|
| 4,420,778 | 12/1983 | Sakamoto | 360/77 |
| 4,467,373 | 8/1984 | Taylor et al. | 360/38.1 |
| 4,484,236 | 11/1984 | Wilkinson | 360/10.3 |
| 4,486,796 | 12/1984 | Sakamoto | 360/77.17 |
| 4,491,886 | 1/1985 | Saito et al. | 360/85 |
| 4,492,991 | 1/1985 | Osada et al. | 360/70 |
| 4,544,967 | 10/1985 | Louth | 360/77 |
| 4,554,598 | 11/1985 | Tarbox et al. | 360/48 |
| 4,581,662 | 4/1986 | Sato | 360/75 |
| 4,609,947 | 9/1986 | Yamagiwa et al. | 386/38 |
| 4,614,991 | 9/1986 | Murakami | 360/137 |
| 4,620,245 | 10/1986 | Shimizu | 360/85 |
| 4,628,372 | 12/1986 | Morisawa | 360/40 |
| 4,628,383 | 12/1986 | Miyamoto | 360/96.5 |
| 4,636,873 | 1/1987 | Eguchi | 360/8 |
| 4,637,023 | 1/1987 | Lounsbury et al. | 714/54 |
| 4,641,210 | 2/1987 | Ohyama | 360/96.5 |
| 4,642,714 | 2/1987 | Miyamoto | 360/96.5 |
| 4,644,414 | 2/1987 | Yamada et al. | 360/10.2 |
| 4,651,239 | 3/1987 | Omori et al. | 360/77 |
| 4,654,731 | 3/1987 | Froschl et al. | 360/96.5 |
| 4,663,673 | 5/1987 | Doutsubo | 360/9.1 |
| 4,665,447 | 5/1987 | Odaka | 360/77 |
| 4,677,504 | 6/1987 | Yamazaki et al. | 360/77 |
| 4,680,654 | 7/1987 | Shibuya | 360/96.5 |
| 4,682,247 | 7/1987 | Doutsbo | 360/10.2 |
| 4,688,109 | 8/1987 | Sangu | 360/10.2 |
| 4,703,373 | 10/1987 | Oosaka | 360/97 |
| 4,714,971 | 12/1987 | Sigiki et al. | 360/77 |
| 4,717,974 | 1/1988 | Baumeister | 360/64 |
| 4,731,678 | 3/1988 | Takeuchi | 360/40 |
| 4,737,865 | 4/1988 | Murakami et al. | 360/14 |
| 4,739,420 | 4/1988 | Odaka et al. | 360/77 |
| 4,758,904 * | 7/1988 | Takahashi et al. | 386/67 |
| 4,758,911 | 7/1988 | Nakano et al. | 360/64 |
| 4,760,474 | 7/1988 | Takimoto | 360/64 |
| 4,769,811 | 9/1988 | Eckberg, Jr. et al. | 370/236 |
| 4,774,605 | 9/1988 | Kato | 360/72.2 |
| 4,786,011 | 11/1988 | Fujiwara et al. | 360/30.21 |
| 4,796,115 | 1/1989 | Ohshima et al. | 360/85 |
| 4,799,221 * | 1/1989 | Fukami et al. | 714/764 |
| 4,802,172 | 1/1989 | Fukami et al. | 360/60 |
| 4,809,093 | 2/1989 | Hamabe et al. | 360/67 |
| 4,812,924 | 3/1989 | Fukami et al. | 360/32 |
| 4,821,129 | 4/1989 | Culp | 360/74.4 |
| 4,835,628 | 5/1989 | Hinz et al. | 360/48 |
| 4,843,495 | 6/1989 | Georgis et al. | 360/77.15 |
| 4,845,577 | 7/1989 | Georgis et al. | 360/72.2 |
| 4,897,739 | 1/1990 | Hasegawa et al. | 360/37.1 |
| 4,918,546 | 4/1990 | Saito | 360/77.13 |
| 4,930,027 | 5/1990 | Steele et al. | 360/70 |
| 4,933,784 | 6/1990 | Oldershaw et al. | 360/77.16 |
| 4,935,824 | 6/1990 | Nakano et al. | 360/48 |
| 4,935,827 | 6/1990 | Oldershaw et al. | 360/77.16 |
| 4,970,612 | 11/1990 | Renders et al. | 360/95 |
| 4,977,469 | 12/1990 | Yokozawa | 360/77.01 |
| 4,984,104 | 1/1991 | Takahashi et al. | 360/77.14 |
| 5,003,411 | 3/1991 | Nagahara et al. | 360/72.2 |
| 5,034,833 | 7/1991 | Marlowe | 360/96.5 |
| 5,050,018 | 9/1991 | Georgis et al. | 360/77.16 |
| 5,068,757 | 11/1991 | Hughes et al. | 360/77.13 |
| 5,103,355 | 4/1992 | Steele | 360/77.13 |
| 5,115,500 | 5/1992 | Larsen | 712/209 |
| 5,142,422 | 8/1992 | Zook et al. | 360/54 |
| 5,191,491 | 3/1993 | Zweighaft | 360/77.13 |
| 5,251,077 | 10/1993 | Saitoh | 360/53 |
| 5,253,126 | 10/1993 | Richmond | 360/53 |
| 5,262,905 | 11/1993 | Takagi et al. | 360/53 |
| 5,278,815 | 1/1994 | Mashimo et al. | 369/47.21 |
| 5,327,305 | 7/1994 | Thomas | 360/74.5 |
| 5,349,481 | 9/1994 | Kauffman et al. | 360/74.4 |
| 5,414,570 | 5/1995 | Fry et al. | 360/48 |
| 5,535,068 | 7/1996 | Hughes | 360/13.04 |
| 5,602,694 | 2/1997 | Miles et al. | 360/84 |
| 5,633,764 | 5/1997 | Ohta | 360/7 |
| 5,781,688 | 7/1998 | Seong | 386/79 |
| 5,872,997 | 2/1999 | Golson | 710/52 |
| 5,953,177 | 9/1999 | Hughes | 360/74.1 |

\* cited by examiner

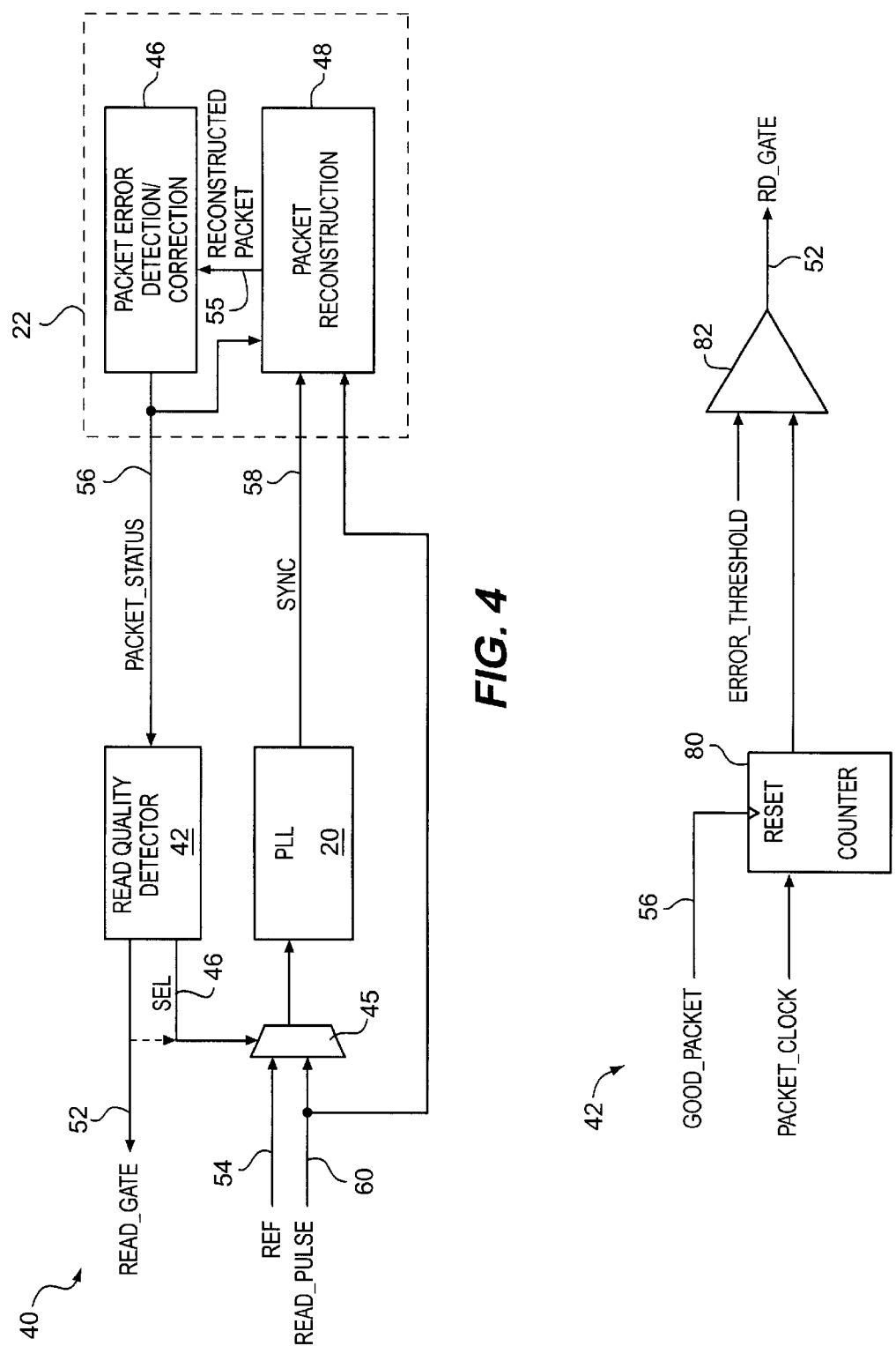

METHOD OF REACQUIRING CLOCK SYNCHRONIZATION ON A NON-TRACKING HELICAL SCAN TAPE DEVICE

FIELD OF THE INVENTION

The present invention pertains generally to magnetic tape drives, and more particularly to a method of reacquiring clock synchronization in a non-tracking helical scan tape device.

RELATED PATENTS

The present invention is related to co-pending U.S. patent application entitled "Method And Apparatus For Logically Rejecting Previously Recorded Track Residue From Magnetic Media", invented by McAuliffe et al., and having a Ser. No. 09/192,794, filed concurrently herewith on Nov. 16, 1998, and co-pending U.S. patent application entitled "Method And System For Monitoring And Adjusting Tape Position Using Control Data Packets", invented by McAuliffe et al., and having a Ser. No. 09/193,030, filed concurrently herewith on Nov. 16, 1998, and co-pending U.S. patent application entitled "Rogue Packet Detection And Correction Method For Data Storage Device", invented by McAuliffe et al., and having a Ser. No. 09/192,809, filed concurrently herewith on Nov. 16, 1998, and co-pending U.S. patent application entitled "Variable Speed Recording Method and Apparatus for a Magnetic Tape Drive", invented by Beavers et al., and having a Ser. No. 09/176,079, filed on Oct. 20, 1998, and U.S. patent application entitled "Overscan Helical Scan Head for Non-Tracking Tape Subsystems Reading at up to 1×Speed and Method for Simulation of Same", invented by Blatchley et al., and having a Ser. No. 09/176,013, filed on Oct. 20, 1998, now U.S. Pat. No. 6,246,551, and co-pending U.S. patent application entitled "Fine Granularity Rewrite Method and Apparatus for Data Storage Device", invented by Zaczek, and having a Ser. No. 09/176,015, filed on Oct. 20, 1998, and co-pending U.S. patent application entitled "Multi-level Error Detection and Correction Technique for Data Storage Recording Device", invented by McAuliffe et al., and having a Ser. No. 09/176,014, filed on Oct. 20, 1998, all of which are commonly owned and all of which are hereby incorporated by reference.

BACKGROUND OF THE INVENTION

A traditional magnetic storage device relies on a track-following architecture in which the tape drive attempts to follow a previously written track when reading it back by maintaining a very precise alignment between the path traced by the read heads and the written tracks on a tape.

In a track-following architecture, the read channel circuitry employs a phase locked loop (PLL) which locks a synchronization clock signal to the read signal (i.e., the incoming data from the read heads) in order to properly perform data detection. In track-following storage devices, the PLL acquires lock of the clock synchronization signal once at the beginning of the read session, and maintains lock for the entire session.

Recently, non-track-following storage devices have been developed. In these non-tracking storage devices, the previously written track is not followed continuously. Instead the read head may begin on one track and drift over to an adjacent track during the read operation. In this situation, the read signal will degrade during the crossover period, and clock synchronization may be lost. If the frequency of the clock synchronization signal drifts too far during this crossover period, it will prevent reacquisition of lock when approaching the next adjacent track. A similar effect can happen when reading through a long magnetic defect on the tape.

It is difficult to reliably detect when the read heads are deviating from a track based solely on the read head signal amplitude. If the read head is partially over the track that it is departing from, and in addition is partially over an adjacent track being approached, the overall signal amplitude may not be detectably reduced. However, the signal quality would prevent the data from either track from being successfully read.

Accordingly, a need exists for a method for detecting when a read head is moving off track and for reacquiring clock synchronization in a non-tracking storage device when the read head moves off track.

SUMMARY OF THE INVENTION

The present invention is a novel method of reacquiring clock synchronization in a non-tracking storage device when the quality of the read signal goes below a predetermined threshold. In accordance with the invention, the packet error detection status is monitored. During a normal successful read, a phase locked loop (PLL) receives the read signal comprising data recovered from the tape. A read quality detector utilizes the packet error detection status to determine whether the read packet error count exceeds a predetermined error count threshold. When the error threshold is reached or exceeded, the read channel is disabled and PLL is relocked to a reference frequency. The read channel is then re-enabled and the process repeated to monitor whether the read head is on or off track.

In accordance with one embodiment of the invention, if the packet decoder detects one or more good packets, the quality of the read signal is considered to be acceptable. If subsequently no good packets out of a predetermined number of subsequent recovered packets are detected, the quality of the read signal is considered unacceptable. This may be caused because the read head is off track or over a defect region of the tape. A counter receives a reconstructed packet clock that pulses once each time a packet is reconstructed. The counter is reset each time a good packet is detected. The read quality detector compares the the count value in the counter to a predetermined error count threshold. When the error threshold is reached or exceeded, the read quality detector shuts down the read channel, switches the input to the PLL from the read signal to known reference frequency, and waits a predetermined amount of time in order for the PLL to relock to the reference frequency. At the end of the wait period, the read quality detector re-enables the read channel and switches the input to the PLL back to the read signal.

BRIEF DESCRIPTION OF THE DRAWING

The invention will be better understood from a reading of the following detailed description taken in conjunction with the drawing in which like reference designators are used to designate like elements, and in which:

FIG. 4 is a block diagram of one embodiment of a clock synchronization signal reacquisition system in accordance with the invention;

FIG. 5 is a block diagram of one embodiment of a read quality detector circuit for determining whether clock synchronization reacquisition should be reacquired.

DETAILED DESCRIPTION

A novel method for detecting when the read head is drifting off track in a non-tracking storage device and for reacquiring clock synchronization after the read head has moved off track is described in detail hereinafter. The invention is described in the context of a helical scan tape drive, but those skilled in the art will appreciate that the method of the invention may be applied in any non-tracking storage device.

Figure 1:
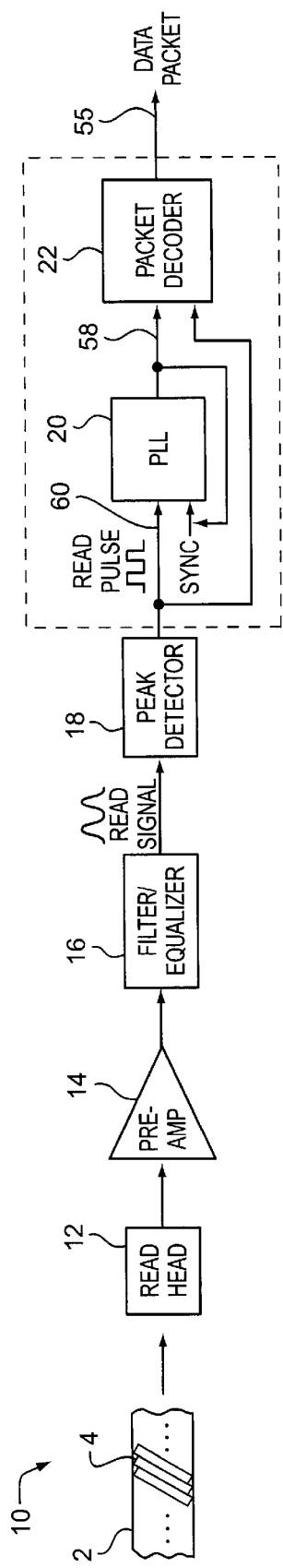
FIG. 1 is a block diagram of a read channel for a magnetic recording system.

FIG. 1 is a block diagram of a read channel 10 for a magnetic recording system. Read channel 10 comprises an electromagnetic read head 12 having means for detecting the magnetic fields stored by the particles on a magnetic media such as tape 2 and for converting the received electromagnetic signals to electronic signals. A preamplifier 14 then receives the electronic signal from read head 12, which is typically in the mV range, and amplifies it typically to the hundreds of mV range. A filter/equalizer 16 receives the amplified signal from preamplifier 14 to equalize the channel response and filter out unwanted noise. A peak detector 18 generates a digital pulse train from the equalized output of equalizer 16. The digital pulse train is phase locked to a synchronization clock signal SYNC by phase locked loop (PLL) 20, and then decoded into packets by packet decoder 22.

Figure 2B:
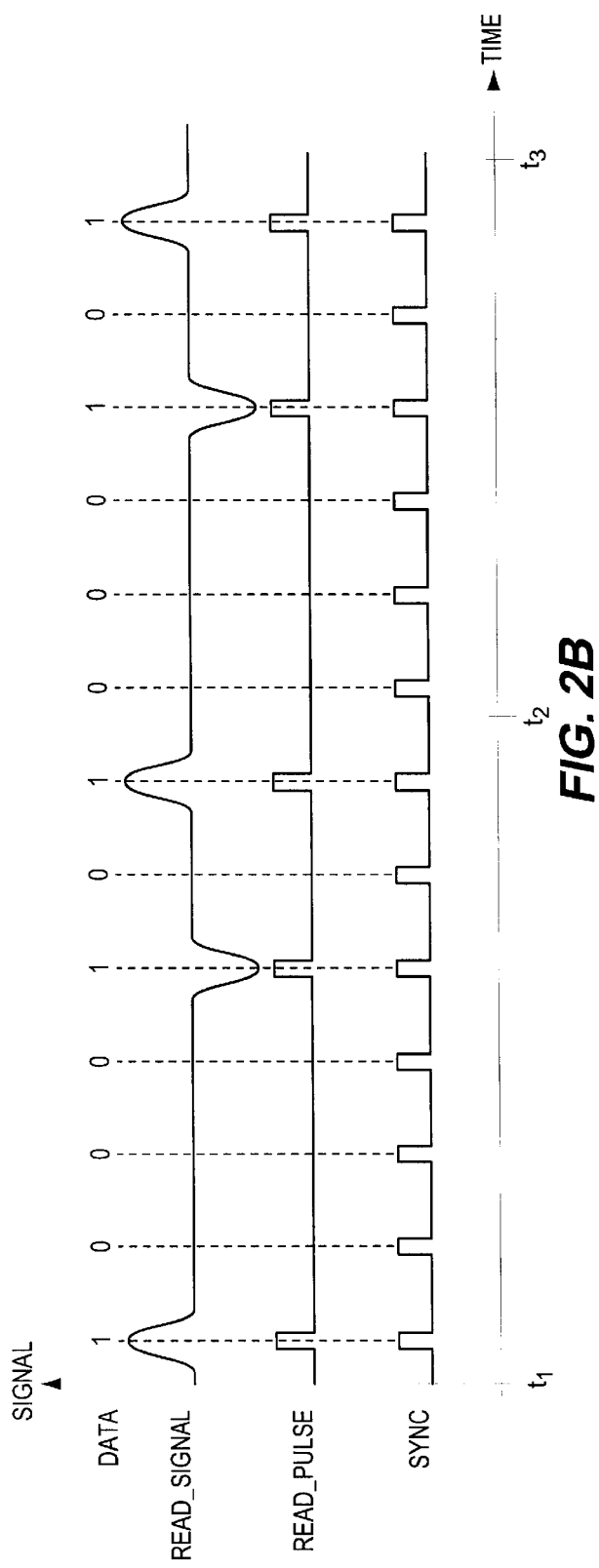
FIG. 2(b) is a timing diagram illustrating the recovery of data when the read head is on track.
Figure 2A:
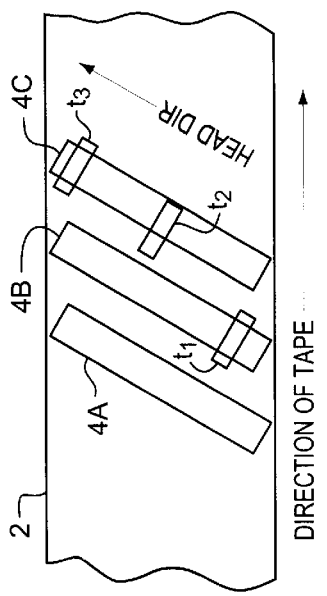
FIG. 2(a) is a view of a portion of the recording surface of a tape comprising a plurality of tracks illustrating a read head that is on track.

FIG. 2(a) is a view of a portion of the recording surface of a tape 2 comprising a plurality of tracks 4a, 4b, 4c, illustrating the position of read head 12 at three different times t1, t2, t3, when it is aligned completely over a given track 4b, hereinafter referred to as "on track". As illustrated, at each subsequent moment in time, t1, t2 and t3, read head 12 is completely aligned over track 4b. This configuration lends itself to the suitability of frequency-mode clock synchronization as described with reference to FIG. 2(b).

FIG. 2(b) is a timing diagram illustrating the recovery of an example DATA pattern "1000101000101" from tape 2 when the read head is on track. During the recording of the data pattern DATA to tape, it was clocked out to the tape by the drive's write channel one bit per fixed interval in time (e.g., 58.5 Mbits/sec). A binary bit value of "1" results in an analog pulse being written to tape. This is accomplished by creating a magnetic field that alternates the polarity of the magnetic particles on the tape 2. When a binary bit value of "0" is written to tape 2, the magnetic polarity of the last binary "1" is maintained. During data recovery, peak detector 18 receives the analog read signal READ_SIGNAL, detects the analog pulse peaks to determine when a binary one occurs, and generates a digital pulse for each detect analog pulse peak. Accordingly, when reading back data pattern DATA from tape 2, digital pulse train READ_PULSE comprises a digital pulse aligned with each peak detected from analog read signal READ_SIGNAL. With this methodology, the location of binary "1"s is easily detectable; however, the number of binary "0"s in between each binary "1" is not easily detectable because there are no detectable signal separators between adjacent binary "0"s.

Accordingly, a clock synchronization signal SYNC is phase-locked to the data pulse train READ_PULSE by PLL 20. When data is recovered from tape 2, the clock synchronization signal SYNC is locked to the frequency of the data by PLL 20. Various methods are known in the art to provide phase-lock of a synchronization signal to an incoming data signal.

Figure 3A:
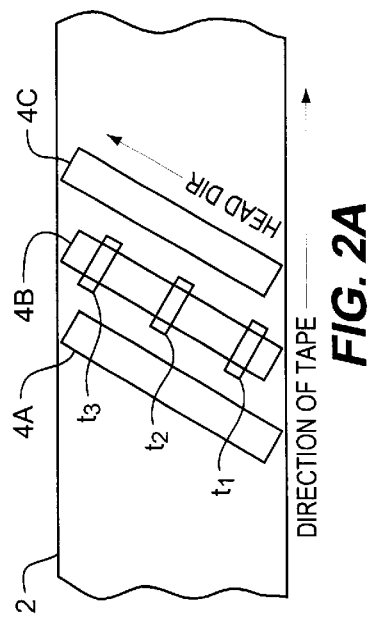
FIG. 3(a) is a view of a portion of the recording surface of a tape comprising a plurality of tracks illustrating a read head that is off track.

FIG. 3(a) is a view of a portion of the recording surface of a tape 2 comprising a plurality of tracks 4a, 4b, 4c, illustrating the position of read head 12 at three different times t1, t2, t3, when the read head 12 is not tracking. As illustrated, at time t1, read head 12 is completely aligned over track 4b. At time t2, read head 12 has drifted towards adjacent track 4c, and is positioned approximately half over track 4b and half over track 4c. At time t3, read head 12 has drifted even further away from track 4b such that it is positioned completely over adjacent track 4c.

In this embodiment, as is a typical occurrence in a non-tracking storage device, the read head 12 drifts across two or more adjacent tracks during a single pass of the read head 12 over the tape 2. When the position of the read head 12 is only partially over or is completely off of a particular track, it is considered to be "off track" with respect to that particular track. As the amount of signal amplitude detected by the read head, and hence the ratio of detected signal to actual signal, reduces, the signal quality and hence data reliability degrades.

Figure 3B:
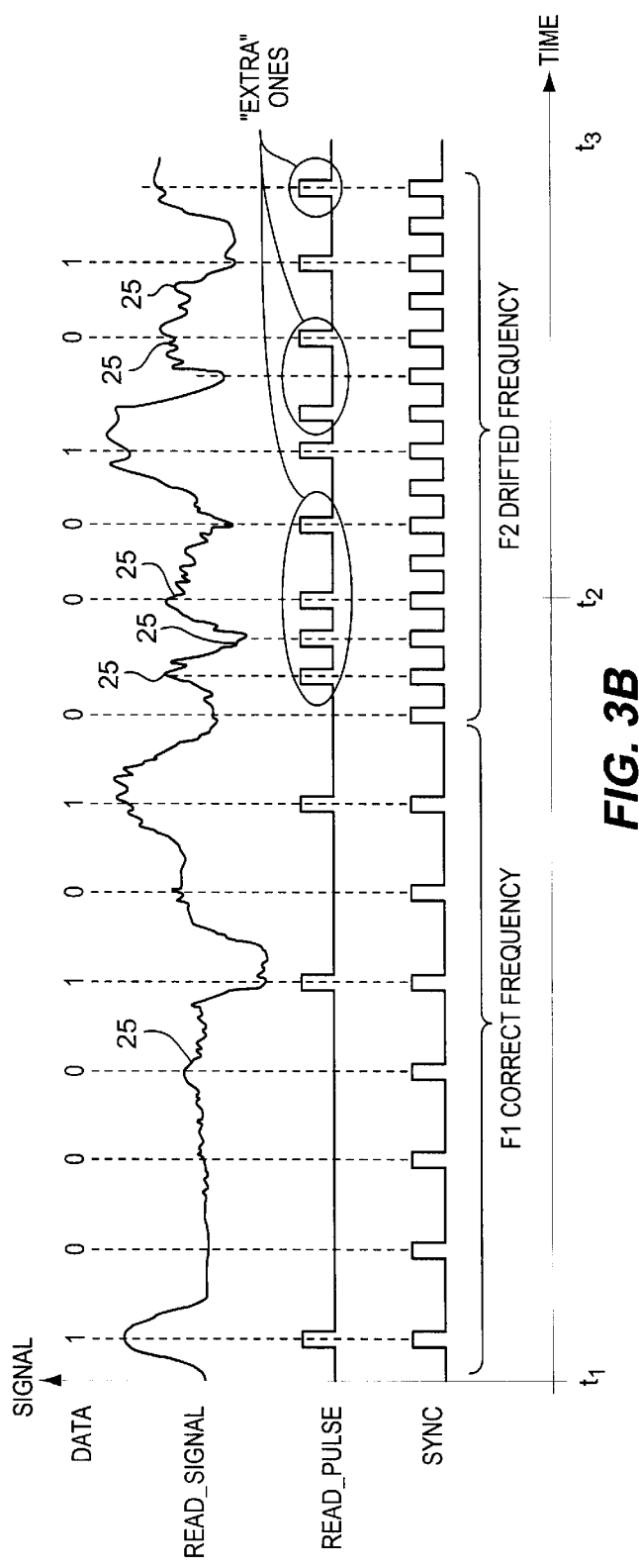
FIG. 3(b) is a timing diagram illustrating the recovery of data when the read head is off track.

FIG. 3(b) is a timing diagram illustrating the degradation of the read signal READ_SIGNAL as the read head 12 drifts off track. As with track-following architecture drives, when the data pattern DATA was recorded onto tape 2, it was clocked out to the tape by the drive's write channel one bit per fixed interval in time.

When the read head 12 is on track, as illustrated in FIGS. 2(a) and 2(b), the analog read signal READ_SIGNAL is clean and has suitable amplitude for each analog pulse as illustrated in FIG. 2(b). Accordingly, the clock synchronization signal SYNC follows the frequency F1 of the data. If the read head moves off track, however, such as at time t2 in FIG. 3(a), the analog read signal READ_SIGNAL begins to deteriorate, as shown in FIG. 3(b) at 25 with extra perturbations and noisy peaks. If the analog read signal READ_SIGNAL deteriorates too far, the PLL 20 loses lock and drifts in frequency. When the PLL loses lock, the clock synchronization signal SYNC cannot follow the data, resulting in unknown locations of the binary "0"s. As the read head 12 keeps moving off a track (e.g., 4b) and approaches the next track (e.g., 4c), the PLL 20 needs to lock back onto the data pulse train READ_PULSE generated by peak detector 18 from data recovered from the next track 4c. However, if during the crossover (e.g., at time t2) between adjacent tracks (e.g., 4b and 4c) the PLL 20 loses lock and the frequency of the clock synchronization signal SYNC drifts too far (illustrated at F2), the PLL 20 can never reacquire lock of the clock synchronization signal SYNC.

FIG. 4 is a block diagram of one embodiment of a system 40 for reacquiring dock signal synchronization implemented in accordance with the invention. In system 40 PLL 20 locks the dock synchronization signal SYNC 58 to one of either the digital read signal READ_PULSE 60 or a reference frequency signal REF 54 that is preferably equal to the standard recording frequency of the drive. A switch 45 receives both of, and outputs one of, read signal READ_PULSE 60 and reference frequency signal REF 54 in response to a select signal. In the preferred embodiment, the select signal is a read gate signal READ_GATE 52 that is also used to control the timing of the read head signal with respect to the position of the read head 12 over the tape 2. The output of switch 45 serves as the input signal of PLL 20 to which the clock synchronization signal SYNC 58 is locked.

Read gate signal READ_GATE 52 is a read head enable signal. When read gate signal READ_GATE 52 is asserted, read head 12 reads data from the tape. When read gate signal READ_GATE 52 is deasserted, read head 12 is disabled from reading data from the tape 2, or in the alternative, data detected by read head 12 when READ_GATE 52 is deasserted is simply ignored.

System 40 also includes a read quality detector 42, which may be implemented in hardware, software, or a combination of both. Read quality detector 42 monitors a packet status 56 and controls the state of read gate signal READ_GATE 52 according to a set of rules, discussed hereinafter.

Packet decoder 22 includes a packet reconstruction circuit 48 and packet error detection and/or correction logic 46. Packet reconstruction circuit 48 extracts each incoming data bit from digital pulse train READ_PULSE 60 in synchronization with the clock synchronization signal SYNC 58 to reconstruct each data packet coming off the tape 2. Packet error detection and/or correction logic 46 detects and/or corrects errors in the reconstructed packet 55 and indicates a status 56 of the reconstructed packet 55. The packet status 56 may be stored in one or more registers (not shown) that are accessed by read quality detector 42, or may be sent as a signal or signals to read quality detector 42.

Read quality detector 42 monitors the packet status 56 for each detected packet and determines whether read head 12 is on or off track. During an off track condition, fewer or no good packets are detected. This fact is used in the invention to ascertain whether the read head 12 is on or off track.

FIG. 5 is a block diagram of one embodiment of a read quality detector 42 for monitoring the quality of the read signal received from the read head. In this embodiment, packet status signal 56 is a signal GOOD_PACKET that pulses logically high if the reconstructed packet 55 is error free; packet status signal GOOD_PACKET remains a logical low if the packet error detection/correction logic 46 detects an error in reconstructed packet 55. Read quality detector 42 comprises a counter 80 that receives a reconstructed packet clock PACKET_CLK that pulses once to each time an amount of time elapses that is equal to the amount of time during which a packet 55 should have been reconstructed. Counter 80 has a reset input RESET that receives packet status signal GOOD_PACKET. In operation, counter 80 increments once for each PACKET_CLK signal pulse. If no errors are detected in reconstructed packet 55, packet status signal GOOD_PACKET will also pulse, thereby clearing the count value of counter 80 to zero. Accordingly, when the read head is on track and good (i.e., error-free) packets are being detected, the count value in counter 80 will generally remain at or close to zero. However, as the read head moves off track, or when the read head passes over a magnetic defect on tape, the quality of the signal degrades and the number of detected packet errors increases. Accordingly, GOOD_PACKET signal does not reset counter 80, and therefore the count value in counter 80 increases.

Read quality detector 42 includes a comparator 82 which compares the count value in counter 80 to a predetermined error count threshold ERROR_THRESHOLD. In the illustrative embodiment, ERROR_THRESHOLD is set to five such that clock synchronization is reacquired each time the packet error correction/detection logic 46 detects five consecutive "bad" packets.

Comparator 82 monitors the count value in counter 80, which represents the total number of consecutive packets that contained errors since the last good packet was seen by the read head. If the count value exceeds the predetermined error count threshold ERROR_THRESHOLD, the read gate signal READ_GATE 52 is deasserted, thereby disabling the read channel and switching the input to PLL 20 to the reference frequency REFERENCE, causing PLL 20 to relock to reference frequency REFERENCE. In the preferred embodiment, REFERENCE is preferably the recording frequency of the drive. Read quality detector 42 causes the select signal READ_GATE 52 to remain deasserted for a period of time long enough to allow the PLL 20 to relock to the reference frequency REFERENCE. In the illustrative embodiment, this amount of time is the equivalent of the amount of time it takes the read channel packet reconstructor 48 to reconstruct one-and-a-half packets.

Once PLL 20 is relocked to the reference frequency REF, the read gate signal READ_GATE 52 is reasserted and the packet errors are once again monitored to determine whether the read head 12 is on or off track. The process is repeated each time the packet error detection logic 46 detects an error in a number of consecutive reconstructed packets that matches the error threshold ERROR_THRESHOLD.

Figure 6:
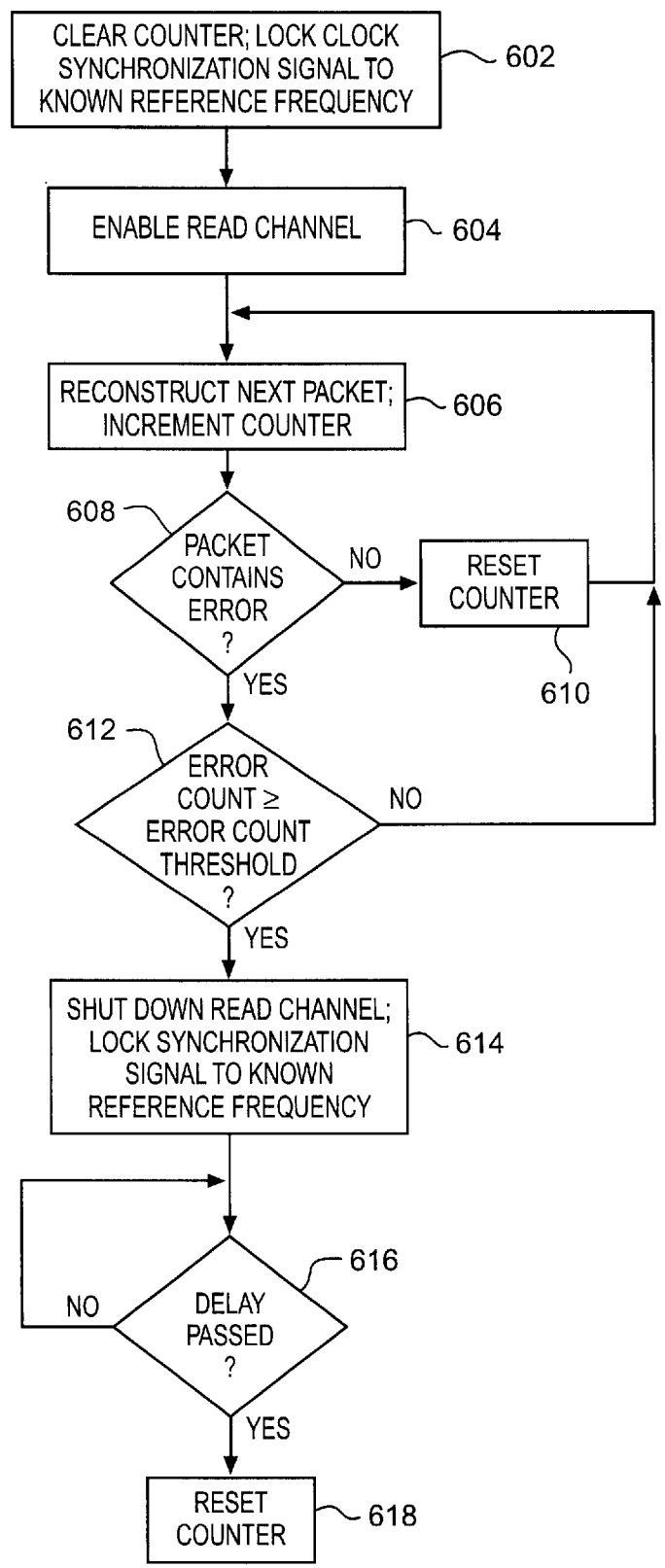
FIG. 6 is a flowchart illustrating one embodiment of a method in accordance with the invention for determining whether clock synchronization should be reacquired.

FIG. 6 is a flowchart of one embodiment of the method performed by read quality detector 42. In a step 602, the count value in counter 80 is cleared to zero and the clock synchronization signal is locked to the reference frequency, preferably the standard recording frequency of the storage device. This is accomplished by switching the input to the PLL 20 to the reference frequency REFERENCE and waiting long enough (in the illustrative embodiment, one-and-a-half packet dock cycle periods) for the PLL 20 to achieve lock. The read channel is enabled in step 604. This is accomplished by asserting the read gate signal READ_GATE 52, which starts up the digital read pulse train READ_PULSE again. The assertion of read gate signal READ_GATE 52 also switches the input to the PLL 20 to the read pulse train READ_PULSE 60 to allow PLL 20 to attempt to lock on the data itself. A packet is reconstructed and the count value is incremented in step 606. Error detection is performed on the reconstructed packet in step 608. If no error is detected in the packet, the counter 80 is reset and the count value is cleared to zero in step 610. Another packet is processed and steps 606 through 608 are then repeated. If an error is detected in the reconstructed packet, however, in step 612, the count value is compared to a predetermined error count threshold. If the error count is less than the error count threshold, another packet is processed and steps 606 through 612 are repeated.

If the error count meets or exceeds the predetermined error count threshold, reacquisition of clock synchronization is triggered. This is accomplished by shutting down the read channel and switching the input of the PLL 20 to receive the reference frequency REFERENCE in step 614. In the illustrative embodiment, the read channel is shut down by deasserting read gate signal READ_GATE 52. A predetermined delay passes in step 616 to allow the PLl 20 to acquire lock on the reference frequency. Counter 80 is then cleared in step 618, and the read channel is started back up again with step 604. The process repeats continuously while the storage device is reading data from the tape.

It will be appreciated by those skilled in the art that the method for determining the quality of the read signal via the packet error status may be otherwise variously embodied without deviating from the scope and spirit of the invention, and that the method presented herein is by way of illustration only and not limitation.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A clock synchronization reacquisition apparatus for a non-tracking storage device comprising a read channel which generates a read signal based on detection of data from a storage medium in said non-tracking storage device and which reconstructs data packets from said read signal, comprising:

a read quality detector which monitors a packet error status associated with each of a respective one of a predetermined number of a plurality of packets reconstructed from said read signal, said packet error status indicative of whether or not an error was detected in said reconstructed packet associated with said packet error status, said read quality detector generating a read quality signal indicative of the quality of said read signal based on the number of said plurality of packets in which an error was detected;

a phase locked loop (PLL) which receives an input signal and generates a clock synchronization signal that is locked to said input signal; and a switch which receives said read signal and a reference frequency signal and outputs one or the other of said read signal or said reference frequency signal as said input signal of said PLL in response to said read quality signal.

2. A clock synchronization reacquisition apparatus in accordance with claim 1, comprising:

a packet error detector which detects an error in a reconstructed packet and generates said packet error status indicative of whether or not an error was detected in said reconstructed packet.

3. A clock synchronization reacquisition apparatus in accordance with claim 1, wherein:

said read quality detector comprises:

a counter which maintains a packet error count, said packet error count representing said number of said plurality of packets in which an error was detected; and a comparator which compares said packet error count to an error count threshold to generate said read quality signal.

4. A method for reacquiring synchronization of a clock synchronization signal with a data signal in a non-tracking storage device, said non-tracking storage device comprising a read channel, said read channel comprising a read head which generates a data signal based on detection of data from a storage medium in said non-tracking storage device, a phase locked loop (PLL) which receives one of either a reference frequency or said data signal and generates said clock synchronization signal locked to said one of either said reference frequency or said data signal, and a packet reconstructor which reconstructs data packets from said data signal synchronized with said clock synchronization signal, said method comprising:

switching said PLL to receive said data signal;

monitoring a packet error status associated with each of a respective one of a predetermined number of a plurality of packets reconstructed from said read signal, said packet error status indicative of whether or not an error was detected in said reconstructed packet associated with said packet error status;

detecting an unacceptable read quality condition, said unacceptable read quality condition based on the number of said plurality of packets in which an error was detected; and upon detection of said unacceptable read quality condition:

switching said PLL to receive said reference frequency;

locking said clock synchronization signal to said reference frequency; and repeating said method.

5. A method in accordance with claim 4, comprising:

repeating said switching step through said detecting step.

* * * * *